United States Patent
Wang et al.

(10) Patent No.: US 12,426,038 B2
(45) Date of Patent: Sep. 23, 2025

(54) METHOD AND APPARATUS FOR RETRANSMISSION OF HYBRID AUTOMATIC REPEAT REQUEST-ACKNOWLEDGEMENT

(71) Applicant: SHARP KABUSHIKI KAISHA, Sakai (JP)

(72) Inventors: Hai-Han Wang, Taipei (TW); Chia-Hung Wei, Taipei (TW); Chia-Hsin Lai, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 438 days.

(21) Appl. No.: 17/881,190

(22) Filed: Aug. 4, 2022

(65) Prior Publication Data
US 2023/0046759 A1 Feb. 16, 2023

Related U.S. Application Data

(60) Provisional application No. 63/260,045, filed on Aug. 6, 2021.

(51) Int. Cl.
*H04W 72/1268* (2023.01)
*H04L 1/00* (2006.01)
(Continued)

(52) U.S. Cl.
CPC ....... *H04W 72/1268* (2013.01); *H04L 1/0003* (2013.01); *H04L 1/1812* (2013.01); *H04L 27/26025* (2021.01); *H04W 72/23* (2023.01)

(58) Field of Classification Search
CPC .............. H04W 72/1268; H04W 72/23; H04L 1/0003; H04L 1/1812; H04L 27/26025;
(Continued)

(56) References Cited

U.S. PATENT DOCUMENTS

2020/0127796 A1\* 4/2020 Li .................. H04L 1/1812
2020/0359401 A1\* 11/2020 Yoshimura ........... H04L 1/1819
(Continued)

FOREIGN PATENT DOCUMENTS

CN 110535587 A 12/2019
CN 111193576 A 5/2020
(Continued)

OTHER PUBLICATIONS

Huawei, "HARQ enhancements in NR unlicensed", 3GPP TSG RAN WG1 Meeting #98bis, R1-1910047 (Year: 2019).\*
(Continued)

*Primary Examiner* — Ayaz R Sheikh
*Assistant Examiner* — Mang Boi Thawng
(74) *Attorney, Agent, or Firm* — ScienBiziP, P.C.

(57) ABSTRACT

A method performed by a UE is provided. The method includes receiving a first DCI format for scheduling at least one HARQ-ACK codebook in at least one first PUCCH in at least one first slot; receiving a second DCI format in a second slot, the second DCI format (i) for scheduling a retransmission of the HARQ-ACK codebook in a second PUCCH and (ii) indicating a first slot offset; and transmitting the first HARQ-ACK codebook scheduled in one of the at least one first slot via the second PUCCH. If the first slot offset is a positive value, the first slot is determined by counting backward a number of slots indicated by the first slot offset from the second slot. If the first slot offset is a negative value, the first slot is determined by counting forward the number of slots indicated by the first slot offset from the second slot.

16 Claims, 4 Drawing Sheets

(51) Int. Cl.
  *H04L 1/1812* (2023.01)
  *H04L 27/26* (2006.01)
  *H04W 72/23* (2023.01)
(58) Field of Classification Search
  CPC ... H04L 1/1822; H04L 1/1854; H04L 1/1861; H04L 1/1864; H04L 5/001; H04L 5/0046; H04L 5/0053; H04L 27/2602; H04L 5/0055
  See application file for complete search history.

(56) References Cited

U.S. PATENT DOCUMENTS

| | | | |
|---|---|---|---|
| 2021/0105102 A1* | 4/2021 | Li | H04L 1/1896 |
| 2021/0211237 A1 | 7/2021 | Yang et al. | |
| 2021/0226740 A1* | 7/2021 | Lei | H04L 1/1864 |
| 2022/0029752 A1 | 1/2022 | Gou et al. | |
| 2022/0078827 A1* | 3/2022 | Zhang | H04L 5/0053 |
| 2022/0216955 A1* | 7/2022 | Kim | H04W 72/23 |
| 2022/0386343 A1* | 12/2022 | Lee | H04W 72/23 |
| 2023/0042048 A1* | 2/2023 | Kim | H04B 7/063 |
| 2023/0155746 A1* | 5/2023 | Ouchi | H04W 72/232 370/329 |
| 2024/0056234 A1* | 2/2024 | Lee | H04L 5/0053 |
| 2024/0187142 A1* | 6/2024 | Lei | H04L 1/1864 |
| 2024/0313929 A1* | 9/2024 | Jung | H04L 1/1816 |

FOREIGN PATENT DOCUMENTS

| | | | | |
|---|---|---|---|---|
| CN | 112887062 A | | 6/2021 | |
| EP | 4412298 A1 | * | 8/2024 | ............ H04W 28/04 |

OTHER PUBLICATIONS

Xiaomi, "Discussion on HARQ enhancement for NR-U", 3GPP TSG RAN WG1 #98b, R1-1911295 (Year: 2019).*
Nokia, "Remaining issues on NR-U HARQ scheduling and feedback", 3GPP TSG RAN WG1 Meeting #100e, R1-2000503 (Year: 2020).*
Sharp, "Remaining issues and corrections on HARQ enhancement for NR-U", 3GPP TSG RAN WG1#100, R1-2000874 (Year: 2020).*
Wilus Inc, "Corrections on HARQ-ACK codebooks for Rel-16 URLLC", 3GPP TSG RAN WG1 #103-e, R1-2008725 (Year: 2020).*
Nokia, "Moderator summary #2 on HARQ-ACK feedback enhancements for NR Rel-17 URLLC/IIoT", 3GPP TSG-RAN WG1 Meeting #104-e, R1-2101818 (Year: 2021).*
CMCC, "Discussion on group scheduling mechanisms", R1-2104632, 3GPP TSG RAN WG1 #105-e e-Meeting, May 10-27, 2021.
3GPP TS 38.213, "3rd Generation Partnership Project; Technical Specification Group Radio Access Network; NR; Physical layer procedures for control (Release 16)", V16.6.0 (Jun. 2021).
Moderator(NOKIA): "Final moderator summary on HARQ-ACK feedback enhancements for NR Rel-17 URLLC/IIoT", R1-2106249, 3GPP TSG-RAN WG1 Meeting #105-e, e-Meeting, May 19-27, 2021.
Nokia et al.: "HARQ-ACK Feedback Enhancements for URLLC/IIoT", R1-2104309, 3GPP TSG RAN WG1 #105-e, e-Meeting, May 19-27, 2021.

* cited by examiner

METHOD AND APPARATUS FOR RETRANSMISSION OF HYBRID AUTOMATIC REPEAT REQUEST-ACKNOWLEDGEMENT

CROSS-REFERENCE TO RELATED APPLICATION(S)

The present disclosure claims the benefit of and priority to U.S. Provisional Patent Application Ser. No. 63/260,045, filed on Aug. 6, 2021, entitled "HARQ-ACK CODEBOOK RETRANSMISSION", the content of which is hereby incorporated herein fully by reference into the present disclosure for all purposes.

FIELD

The present disclosure generally relates to wireless communications and, more specifically, to scheduling retransmission of a Hybrid Automatic Repeat reQuest-ACKnowledgement (HARQ-ACK) codebook.

BACKGROUND

With the tremendous growth in the number of connected devices and the rapid increase in user/network traffic volume, various efforts have been made to improve different aspects of wireless communication for the next-generation wireless communication systems, such as the fifth-generation (5G) New Radio (NR), by improving data rate, latency, reliability, and mobility in these systems.

The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

However, in order to support different types of services simultaneously, there exists a need for further improvements in the art, such as improvements in handling transmission of eMBB traffic that is cancelled due to transmission of URLLC traffic.

SUMMARY

The present disclosure is directed to methods and apparatuses for Hybrid Automatic Repeat reQuest-ACKnowledgement (HARQ-ACK) codebook retransmission.

In a first aspect of the present application, a method for HARQ-ACK retransmission performed by a user equipment (UE) is provided. The method includes: receiving at least one first Downlink Control Information (DCI) format for respectively scheduling at least one HARQ-ACK codebook in at least one first Physical Uplink Control CHannel (PUCCH) in at least one first slot; receiving a second DCI format for scheduling a retransmission of a first HARQ-ACK codebook of the at least one HARQ-ACK codebook in a second PUCCH, the second DCI format being received in a second slot and indicating a first slot offset; determining one of the at least one first slot; and transmitting the first HARQ-ACK codebook scheduled in the one of the at least one first slot via the second PUCCH. In a case that the first slot offset is a positive value, the one of the at least one first slot is determined by counting backward a number of slots indicated by the first slot offset from the second slot, and in a case that the first slot offset is a negative value, the one of the at least one first slot is determined by counting forward the number of slots indicated by the first slot offset from the second slot.

In an implementation of the first aspect, the method further includes determining the first slot offset based on a Modulation and Coding Scheme (MCS) field of the second DCI format. The second DCI format does not schedule a Physical Downlink Shared CHannel (PDSCH).

In another implementation of the first aspect, the second PUCCH is transmitted in a third slot, the second DCI format further indicates a second slot offset, and the third slot is determined based on the second slot and the second slot offset.

In another implementation of the first aspect, the at least one first DCI format includes a field indicating the at least one first PUCCH is transmitted in a first carrier, the second DCI format includes a field indicating the second PUCCH is transmitted in a second carrier, and at least one of the first carrier and the second carrier is a primary cell (PCell).

In another implementation of the first aspect, the first slot offset is indicated based on a subcarrier spacing (SCS) of a reference cell, and the reference cell is the PCell.

In another implementation of the first aspect, the second DCI format further includes a triggering field, and the retransmission of the first HARQ-ACK codebook is triggered by the triggering field having a field value of 1.

In a second aspect of the present disclosure, a UE is provided. The UE includes processing circuitry, a transceiver coupled to the processing circuitry, and a memory coupled to the processing circuitry. The memory stores at least one computer-executable instructions that, when executed by the processing circuitry, causes the UE to: receive at least one first DCI format for scheduling at least one HARQ-ACK codebook in at least one first PUCCH in at least one first slot; receive a second DCI format for scheduling a retransmission of a first HARQ-ACK codebook of the at least one HARQ-ACK codebook in a second PUCCH, the second DCI format being received in a second slot and indicating a first slot offset; determine one of the at least one first slot; and transmit the first HARQ-ACK codebook scheduled in the one of the at least one first slot via the second PUCCH. In a case that the first slot offset is a positive value, the one of the at least one first slot is determined by counting backward a number of slots indicated by the first slot offset from the second slot, and in a case that the first slot offset is a negative value, the one of the at least one first slot is determined by counting forward the number of slots indicated by the first slot offset from the second slot.

In an implementation of the second aspect, the computer-executable instructions, when executed by the processing circuitry, further cause the UE to determine the first slot offset based on an MCS field of the second DCI format. The second DCI format does not schedule a PDSCH.

In another implementation of the second aspect, the second PUCCH is transmitted in a third slot, the second DCI format further indicates a second slot offset, and the third slot is determined based on the second slot and the second slot offset.

In another implementation of the second aspect, the at least one first DCI format includes a field indicating the at least one first PUCCH is transmitted in a first carrier, the second DCI format includes a field indicating the second PUCCH is transmitted in a second carrier, and at least one of the first carrier and the second carrier is a PCell.

In another implementation of the second aspect, the first slot offset is indicated based on an SCS of a reference cell, and the reference cell is the PCell.

In another implementation of the second aspect, the second DCI format further includes a triggering field, and the retransmission of the first HARQ-ACK codebook is triggered by the triggering field having a field value of 1.

In a third aspect of the present disclosure, a base station apparatus is provided. The base station apparatus includes processing circuitry, a transceiver coupled to the processing circuitry, and a memory coupled to the processing circuitry. The memory stores at least one computer-executable instructions that, when executed by the processing circuitry, causes the base station apparatus to: transmit, using the transceiver, at least one first DCI format for scheduling at least one HARQ-ACK codebook in at least one first PUCCH in at least one first slot; and transmit, using the transceiver, a second DCI format for scheduling a retransmission of a first HARQ-ACK codebook of the at least one HARQ-ACK codebook in a second PUCCH, the second DCI format being received in a second slot and indicating a first slot offset. The first HARQ-ACK codebook is scheduled in one of the at least one first slot. In a case that the first slot offset is a positive value, the one of the at least one first slot is a number of slots indicated by the first slot offset before the second slot, and in a case that the first slot offset is a negative value, the one of the at least one first slot is the number of slots indicated by the first slot offset after the second slot.

In an implementation of the third aspect, the second DCI format does not schedule a PDSCH, and the first slot offset is indicated in an MCS field of the second DCI format.

In another implementation of the third aspect, the second PUCCH is scheduled in a third slot, the second DCI format further indicates a second slot offset, and the third slot is associated with the second slot and the second slot offset.

In another implementation of the third aspect, the at least one first DCI format includes a field indicating the at least one first PUCCH is transmitted in a first carrier, the second DCI format includes a field indicating the second PUCCH is transmitted in a second carrier, and at least one of the first carrier and the second carrier is a PCell.

In another implementation of the third aspect, the first slot offset is indicated based on an SCS of a reference cell, and the reference cell is the PCell.

In another implementation of the third aspect, the second DCI format further includes a triggering field, and the retransmission of the first HARQ-ACK codebook is triggered by the triggering field having a field value of 1.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

Figure 1:
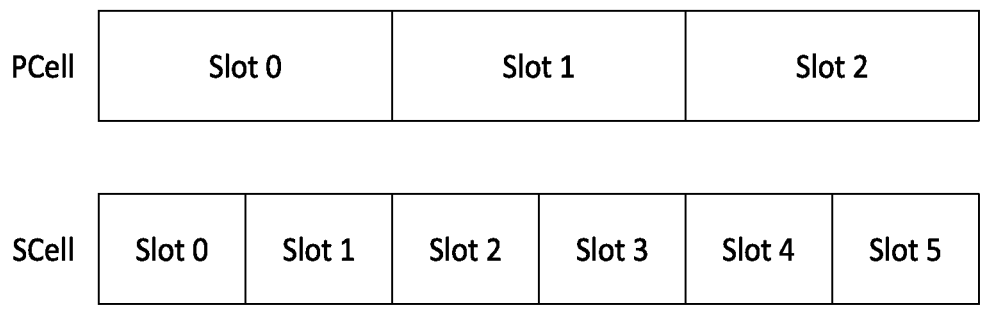
FIG. 1 is a schematic diagram illustrating slots in a PCell and an SCell, according to an example implementation of the present disclosure.

Some of the terms mentioned in the present disclosure are defined as follows.

| Abbreviation | Full name |
| --- | --- |
| AS | Access Stratum |
| BI | Backoff Indicator |
| BS | Base Station |
| BWP | Bandwidth Part |
| CBG | Code Block Group |
| CCCH | Common Control Channel |
| CE | Control Element |
| CG | Configured Grant |
| CN | Core Network |
| CORESET | Control Resource Set |
| C-RNTI | Cell-Radio Network Temporary Identifier |
| CSI | Channel State Information |
| CS-RNTI | Configured Scheduling-Radio Network Temporary Identifier |
| CSS | Common Search Space |
| DAI | Downlink Assignment Index |
| DCI | Downlink Control Information |
| DFI | Downlink Feedback Indication |
| DL | Downlink |
| DRB | Data Radio Bearer |
| DRX | Discontinuous Reception |
| eMBB | enhanced Mobile BroadBand |
| HARQ | Hybrid Automatic Repeat Request |
| HARQ-ACK | Hybrid Automatic Repeat Request-ACKnowledgement |
| IE | Information Elements |
| I-RNTI | Inactive- Radio Network Temporary Identifier |
| LCH | Logical Channel |
| LCG | Logical Channel Group |
| MAC | Medium Access Control |
| MCG | Master Cell Group |
| NDI | New Data Indicator |
| NUL | Normal Uplink |
| NW | Network |
| PCell | Primacy Cell |
| PDCCH | Physical Downlink Control Channel |
| PDSCH | Physical Downlink Shared Channel |
| PHY | Physical Layer |
| PRACH | Physical Random Access Channel |
| PS | Power Saving |
| PUCCH | Physical Uplink Control Channel |
| PUSCH | Physical Uplink Shared Channel |
| RA | Random Access |
| RAPID | Random Access Preamble Identifier |
| RAR | Random Access Response |
| RB | Radio Bearer |
| Rel | Release |
| RLF | Radio Link Failure |
| RNAU | RAN-based Notification Area Update |
| RNTI | Radio Network Temporary Identifier |
| RRC | Radio Resource Control |
| RSRP | Reference Signal Received Power |
| SCell | Secondary Cell |
| SCG | Secondary Cell Group |
| SDT | Small Data Transmission |
| SR | Scheduling Request |
| SRB | Signaling Radio Bearer |
| SS | Search Space |
| SSB | Synchronization Signal (and Physical Broadcast Channel) block |
| SUL | Supplementary Uplink |
| TA | Timing Advance |
| TBS | Transport Block Size |

| Abbreviation | Full name |
| --- | --- |
| UE | User Equipment |
| UL | Uplink |
| URLLC | Ultra-Reliable and Low-Latency Communication |

The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "In some implementations," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations disclosed are oriented to software installed and executing on computer hardware, alternative example implementations implemented as firmware or as hardware or combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

In the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio Network Controller (RNC) as in the UNITS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UNITS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells. Each cell may be operable to provide services to at least one UE within its radio coverage. More specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmissions). The BS may communicate with one or more UEs in the radio communication system through the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided in an NR frame to support ProSe services.

In an NR system, multiple types of services may be supported in a cell, each with different latency and reliability requirements. In a cast that a UE has both eMBB and URLLC traffic, it is possible that PUSCH or PUCCH transmission for eMBB traffic is on-going when URLLC traffic occurs. In this situation, to guarantee that the latency requirement for URLLC traffic is met, a PUSCH or PUCCH transmission for eMBB traffic needs to be cancelled for transmitting an overlapping PUSCH or PUCCH for URLLC traffic. If a PUCCH transmission carrying a HARQ-ACK is cancelled, the gNB needs to re-schedule the PDSCH. As such, the system capacity may be impacted, considering the eMBB PDSCH may consume a large amount of radio resource. Therefore, it is beneficial to design a mechanism for HARQ-ACK retransmission when it is cancelled.

In Rel-16, a UE may be configured with two HARQ-ACK codebooks. One HARQ-ACK codebook has a low priority (e.g., with a priority index 0) and another HARQ-ACK codebook has a high priority (e.g., with priority index 1). Each codebook may be a Type-1 HARQ-ACK codebook or a Type-2 HARQ-ACK codebook.

In Rel-16, due to the introduction of intra-UE prioritization, a low priority HARQ-ACK codebook may be dropped as a result of the low priority PUCCH carrying the low priority HARQ-ACK codebook being dropped or cancelled, if the UE is scheduled with a high priority PUSCH or a high priority PUCCH that overlaps with the low priority PUCCH. It is also possible that a low priority HARQ-ACK codebook multiplexed in a low priority PUSCH is dropped, if the low priority PUSCH overlaps with a high priority PUCCH or with a UL resource indicated by a DCI format 2_4. Furthermore, a high priority HARQ-ACK codebook multiplexed in a high priority PUSCH may also be dropped, if the high priority PUSCH overlaps with a UL resource indicated by a DCI format 2_4 while the UE is not configured with uplinkCancellationPriority.

To sum up, both a high priority HARQ-ACK codebook and a low priority HARQ-ACK codebook may be dropped. Therefore, a mechanism for retransmitting the HARQ-ACK codebooks should be supported.

Enhanced Type-2 HARQ-ACK codebook is introduced in Rel-16 for use of HARQ-ACK codebook retransmission for operation in a cell with shared spectrum channel access. The following fields may be included in a DCI format 1_1 or a DCI format 1_2 for transmission of an enhanced Type-2 HARQ-ACK codebook.

New Feedback Indicator (NFI)

The NFI may act as a toggle bit for a PDSCH group.

If the NFI for the PDSCH group is toggled, the UE may discard the HARQ-ACK feedback for the PDSCH(s) of the PDSCH group, where the PDSCH(s) may be associated with a non-numerical K1 value.

Number of Requested PDSCH Group(s)

The number "0" may be for requesting only the scheduled PDSCH group, and "1" may be for requesting both PDSCH groups.

PDSCH Group Index (1 Bit)

The index may indicate the PDSCH group index of the scheduled PDSCH.

When constructing the enhanced Type-2 HARQ-ACK codebook, the UE may use counter downlink assignment index (DAI), total DAI, and the associated PDCCH monitoring occasions of a PUCCH transmission, for determining the order of the HARQ-ACK bits and the size of the HARQ-ACK codebook in the enhanced Type-2 HARQ-ACK codebook for the PUCCH transmission. The difference between the enhanced Type-2 HARQ-ACK codebook and the Type-2 HARQ-ACK codebook is that the UE may not discard a HARQ-ACK codebook after the PUCCH transmission of the enhanced Type-2 HARQ-ACK codebook. If the NFI value is not toggled between one NFI of the DCI scheduling a first PUCCH and another NFI of the DCI scheduling a second PUCCH, the HARQ-ACK bits in one HARQ-ACK codebook of the first PUCCH is included in the HARQ-ACK codebook of the second PUCCH. In other words, if the NFI values are the same for the scheduling PDCCHs, the DAI values are set continuously for the PDSCHs with the corresponding HARQ-ACKs to be transmitted in consecutive PUCCHs.

To enable retransmission of HARQ-ACKs while ensuring reasonable overhead of HARQ-ACK retransmission, PDSCHs can be divided into two PDSCH groups by assigning each scheduled PDSCH with a PDSCH group index using a PDSCH group index field in the scheduling DCI, and the gNB can request HARQ-ACKs corresponding to PDSCHs of one or both PDSCH groups in a PUCCH by the number of requested PDSCH group field in the DCI scheduling the PUCCH.

The following RRC parameters may be used for configuring an enhanced Type-2 HARQ-ACK codebook. Specifically, an RRC parameter (e.g., pdsch-HARQ-ACK-Codebook-r16) may be configured in PhysicalCellGroupConfig to indicate that the enhanced Type-2 HARQ-ACK codebook is the type of HARQ-ACK codebook that is used in a cell group; an RRC parameter (e.g., nfi-TotalDAI-Included-r16) may be configured in PhysicalCellGroupConfig to indicate that an NFI field and a total DAI field for a first PDSCH group are included in a DCI format 1_1 that schedules PDSCH(s) of a second PDSCH group; and an RRC parameter (e.g., ul-TotalDAI-Included-r16) may be configured in PhysicalCellGroupConfig to indicate that a total DAI field for the first PDSCH group is included in a DCI format 0_1 that schedules a PUSCH which is used for multiplexing a PUCCH scheduled by the DCI format 1_1.

Type-3 HARQ-ACK codebook is introduced in Rel-16 for use of HARQ-ACK codebook retransmission for operation in a cell with shared spectrum channel access. One-shot HARQ-ACK request field may be included in DCI format 1_1 to trigger transmission of a Type-3 HARQ-ACK codebook. If the One-shot HARQ-ACK request field indicates '1', the UE may be triggered to report a Type-3 HARQ-ACK codebook.

A Type-3 HARQ-ACK codebook may consist of the HARQ-ACK bits for all DL HARQ processes of the configured cells. In addition, each new data indicator (NDI) value of the HARQ process in the scheduling DCI may be appended to the HARQ-ACK bit of the corresponding HARQ process. When the NDI is not included in a Type 3 HARQ-ACK codebook, the UE may set the HARQ-ACK bit as NACK for a HARQ process ID once ACK is reported for the same HARQ process ID in the previous feedback. Furthermore, code block group (CBG) level HARQ-ACK bits may also be included.

The ordering of information for HARQ-ACK bits in a Type 3 HARQ-ACK codebook is as follows:
 First, in increasing order of CBG index;
 Second, in increasing order of TB index;
 Third, in increasing order of HARQ process ID; and
 Fourth, in increasing order of Serving cell index.

An RRC parameter (e.g., pdsch-HARQ-ACK-Feedback-r16) may be configured in PhysicalCellGroupConfig to indicate that the Type-3 HARQ-ACK codebook is used in a cell group. It may be configured regardless of whether Type-1 HARQ-ACK codebook, Type-2 HARQ-ACK codebook or enhanced Type-2 HARQ-ACK codebook is configured in the cell group.

An RRC parameter (e.g., pdsch-HARQ-ACK-OneShot-FeedbackNDI-r16) may be configured in PhysicalCellGroupConfig to indicate that the NDI is included in a Type-3 HARQ-ACK codebook.

An RRC parameter (e.g., pdsch-HARQ-ACK-OneShot-FeedbackCBG-r16) may be configured in PhysicalCellGroupConfig to indicate that the CBG level HARQ-ACK is included in a Type-3 HARQ-ACK codebook for the $N_{cells}^{DL,CBG}$ cells configured with CBG transmission.

When constructing a Type 1 HARQ-ACK codebook, the number of HARQ-ACK bits for a slot may be determined based on a Time Domain Resource Allocation (TDRA) table and a time domain duplex (TDD) configuration. A maximum number of non-overlapping PDSCH candidate positions in a slot may be determined based on start and length indicators (SLIVs) in the TDRA table and the available symbols (DL or flexible symbols) in the slot, and the number of HARQ-ACK bits in the slot may be the maximum number of non-overlapping PDSCH candidate positions in the slot, where each PDSCH candidate position of the PDSCH candidate positions that may be used to allocate the maximum number of non-overlapping PDSCHs or semi-persistent scheduling (SPS) PDSCHs may have a corresponding HARQ-ACK bit. The HARQ-ACK bit location for a HARQ-ACK bit corresponding to a PDSCH or an SPS PDSCH in the slot may be determined based on the SLIV for the PDSCH. Specifically, the HARQ-ACK bit location for a PDSCH or an SPS PDSCH using an SLIV may be the same as the HARQ-ACK bit location for the HARQ-ACK bit corresponding to the PDSCH candidate position which is one of the PDSCH candidate positions that may be used to allocate the maximum number of non-overlapping PDSCHs or SPS PDSCHs in the slot if the PDSCH candidate position overlaps with the PDSCH or SPS PDSCH using the SLIV.

In some cases, a UE may not report a Type 1 HARQ-ACK codebook. If a UE reports HARQ-ACK information in a PUCCH only for a SPS PDSCH release indicated by DCI format 1_0 with counter DAI field value of 1, a PDSCH reception scheduled by DCI format 1_0 with counter DAI field value of 1 on the PCell, or SPS PDSCH reception(s), within the $M_{A,C}$ occasions for candidate PDSCH receptions as determined in Clause 9.1.2.1 in TS 38.213, the UE may determine a HARQ-ACK codebook only for the SPS PDSCH release, only for the PDSCH reception, or only for one SPS PDSCH reception according to corresponding $M_{A,C}$ occasion(s) on respective serving cell(s), where the value of counter DAI in DCI format 1_0 is according to Table 9.1.3-1 in TS 38.213 and HARQ-ACK information bits are in response to more than one SPS PDSCH receptions that the UE is configured to receive.

PUCCH Carrier Switching

To reduce the latency of HARQ-ACK transmission in TDD carriers, PUCCH resources may be configured in an SCell in addition to the PUCCH resources in PCell and PUCCH SCell. The latency may be reduced since the TDD configuration for different carriers may be different, and the carrier with nearest UL resource available may be used to transmit HARQ-ACK. For a HARQ-ACK bit corresponding to a PDSCH scheduled by a DCI, a PUCCH resource is indicated by the DCI to carry the HARQ-ACK bit, and the carrier in which the PUCCH is transmitted may also be indicated by the DCI.

Multicast PUCCH

PUCCH resources for HARQ-ACK feedback for a group common PDSCH may be configured in a PUCCH-ConfigurationList that is different from the PUCCH-ConfigurationList that is used for configuration of PUCCH resources for HARQ-ACK feedback for dedicated PDSCH, CSI and SR. In other words, a UE may be configured with two PUCCH-ConfigurationList, each PUCCH-ConfigurationLise may include up to two PUCCH-Configs. The first PUCCH-Config in a PUCCH-ConfigurationList includes configuration of PUCCH resources with low physical layer priorities, and the second PUCCH-Config in the PUCCH-ConfigurationList includes configuration of PUCCH resources with high physical layer priorities. The PUCCH-ConfigurationList for group common PDSCH may be configured as part of a common frequency resource (CFR) configuration or may be configured together with the other PUCCH-ConfigurationList that is used for dedicated PDSCH, CSI and SR. In the following, a PUCCH resource configured by the PUCCH-ConfigurationList for group common PDSCH may be referred to as a multicast PUCCH, and a PUCCH resource configured by the PUCCH-ConfigurationList for dedicated PDSCH, CSI and SR may be referred to as a unicast PUCCH.

It is noted that a dedicated PDCCH and a dedicated PDSCH may be referred as to a unicast PDCCH and a unicast PDSCH, respectively. When a unicast PUCCH and a multicast PUCCH overlap or are scheduled in the same slot, the HARQ-ACK codebook for dedicated PDSCHs carried in the unicast PUCCH and the HARQ-ACK codebook for group common PDSCHs carried in the multicast PUCCH may be multiplexed in a unicast PUCCH or in a multicast PUCCH.

When a HARQ-ACK codebook is dropped by a UE, a gNB may request the UE to transmit an enhanced Type-2 HARQ-ACK codebook or a Type-3 HARQ-ACK codebook which includes the HARQ-ACK bits of the dropped HARQ-ACK codebook. However, the enhanced Type-2 HARQ-ACK codebook or the Type-3 HARQ-ACK codebook may include HARQ-ACK bits that are not included in the dropped HARQ-ACK codebook, which may not be needed by the gNB. Consequently, a larger PUCCH resource may be required for the enhanced Type-2 HARQ-ACK codebook or the Type-3 HARQ-ACK codebook which may affect the latency and reliability for the retransmission of the dropped HARQ-ACK codebook. Therefore, a method to retransmit the dropped HARQ-ACK codebook is needed.

Indication of Retransmission of HARQ-ACK Codebook

A signaling for indicating retransmission of a HARQ-ACK codebook and a signaling for indicating a PUCCH resource for the retransmission need to be defined.

In some implementations, a DCI format 1_1 or a DCI format 1_2 may be used to trigger retransmission of a HARQ-ACK codebook. The HARQ-ACK codebook to be retransmitted may be indicated by a PUCCH that carries the HARQ-ACK codebook. The DCI format 1_1 or the DCI format 1_2 may include an indication of a slot offset. The slot offset may indicate the offset in number of slots from a first slot in which the PUCCH that carries the HARQ-ACK codebook to a second slot in which the DCI format 1_1 or the DCI format 1_2 is transmitted. An SL HARQ-ACK or a multicast HARQ-ACK may also be retransmitted if the indicated PUCCH was scheduled to carry the SL HARQ-ACK or the multicast HARQ-ACK. A triggering field may be included in the DCI format 1_1 or the DCI format 1_2 to trigger retransmission of the HARQ-ACK codebook. A value of 0 of the triggering field may indicate no triggering of HARQ-ACK codebook retransmission, and a value of 1 of the triggering field may indicate triggering of HARQ-ACK codebook retransmission. In some implementations, the triggering field may include 2 bits, and some of the codepoints may be used to trigger a Type-3 HARQ-ACK codebook transmission. For example, a codepoint "10" may be used to trigger a Type-3 HARQ-ACK codebook transmission.

A PUCCH resource for retransmission of the HARQ-ACK codebook may be indicated by the same methods that are used for indicating a PUCCH resource for transmission of a HARQ-ACK codebook that contains HARQ-ACK bits corresponding to a PDSCH scheduled by a DCI format 1_0, DCI format 1_1, or DCI format 1_2 as in Rel-15 and Rel-16 NR. That is to say, the PUCCH resource for retransmission of the HARQ-ACK codebook may be selected, based on the "PRI" field, from the PUCCH resource set determined based on the payload size of the HARQ-ACK codebook. The PUCCH may be transmitted in a slot indicated by the "PDSCH-to-HARQ feedback timing indicator" field. It is noted that a DCI format 1_1 or a DCI format 1_2 that triggers retransmission of a HARQ-ACK codebook is referred to as a triggering DCI in the following.

The slot offset may be a positive value or a negative value.

In a case that the slot offset is a positive value, the slot offset may be counted backward from the slot in which the DCI format 1_1 or the DCI format 1_2 is transmitted. For example, when a DCI format 1_1 is transmitted in slot n to trigger retransmission of a HARQ-ACK codebook and indicating a slot offset of 1, the HARQ-ACK codebook carried in a PUCCH in slot n−1 is retransmitted.

In a case that the slot offset is a negative value, the slot offset may be counted forward from the slot in which the DCI format 1_1 or the DCI format 1_2 is transmitted. For example, when a DCI format 1_1 is transmitted in slot n to trigger retransmission of a HARQ-ACK codebook and indicating a slot offset of −1, the HARQ-ACK codebook carried in a PUCCH in slot n+1 is retransmitted.

The slot offset may also be 0, which indicates a HARQ-ACK codebook carried in a PUCCH in the same slot as the triggering DCI is retransmitted.

In some implementations, when the slot is counted backward from the slot in which the DCI format 1_1 or the DCI format 1_2 is transmitted, and the slot offsets may be positive values, 0, or negative values. For example, when a DCI format 1_1 is transmitted in slot n to trigger retransmission of a HARQ-ACK codebook, if the indicated slot offset is −1, the HARQ-ACK codebook carried in a PUCCH in slot n+1 is retransmitted. This is useful for fast triggering retransmission of the HARQ-ACK codebook for the case when the SCS of the triggering DCI is smaller than the SCS of the PUCCH that carries the HARQ-ACK codebook and when slot offset 0 indicates the UL slot with start boundary aligned with the start boundary of the DL slot in which the triggering DCI is transmitted, as described more detailed below.

In some implementations, the slot offset may be indicated by a DCI field in the triggering DCI, and the DCI field may indicate an index to a list of slot offsets which may be predefined or may be configured by RRC parameters. For example, when the list of slot offsets is configured as {1, 2, 3, 4}, a value of 0 in the DCI field may indicate that the slot offset equals to 1, a value of 1 in the DCI field may indicate that the slot offset equals to 2, and so on.

In some implementations, two lists of slot offsets may be configured, and each list is applicable to a HARQ-ACK codebook associated with a PUCCH of a physical layer priority. For example, the first list of slot offset is applicable to a low priority HARQ-ACK codebook, and the second list of slot offset is applicable to a high priority HARQ-ACK codebook. The two lists of slot offsets may be configured separately in the first PUCCH-Config and in the second PUCCH-Config in the PUCCH-ConfigurationList. In some cases, the DCI field may be a new field if the triggering DCI schedules a PDSCH. In some cases, the DCI field may be defined by re-interpret some of the existing field in DCI format 1_1 or DCI format 1_2, such as the "Modulation and coding scheme of transport block 1" field, the "New data indicator of transport block 1" field, the "Redundancy version of transport block 1" field, the "HARQ process number" field, the "Antenna port(s)" field, or the "DMRS sequence initialization" field if the triggering DCI does not schedule a PDSCH. It is noted that when at least one of the following conditions (a) to (c) is met, the triggering DCI does not schedule a PDSCH.

Condition (a): resourceAllocation=resourceAllocationType0 and all bits of the frequency domain resource assignment field in the DCI format are equal to 0.

Condition (b): resourceAllocation=resourceAllocationType1 and all bits of the frequency domain resource assignment field in the DCI format are equal to 1.

Condition (c): resourceAllocation=dynamicSwitch and all bits of the frequency domain resource assignment field in the DCI format are equal to 0 or 1.

Since there may be two non-overlapping PUCCHs of different physical layer priorities in a slot each carrying a HARQ-ACK codebook, an indication of a priority may be needed to identify the HARQ-ACK codebook that is triggered to be retransmitted in addition to the slot offset indication.

In some implementations, the priority may be indicated by the "Priority indicator" field in the triggering DCI. In other words, the PUCCH resource that is used to retransmit the HARQ-ACK codebook has the same physical layer priority as the physical layer priority of the PUCCH resource that carries the HARQ-ACK codebook, since the "Priority indicator" field is used to indicate the physical layer priority of the PUCCH resource that is used to retransmit the HARQ-ACK codebook.

In some implementations, a new field may be used to indicate the priority of the PUCCH that carried the HARQ-ACK codebook if the triggering DCI schedules a PDSCH.

In some implementations, the priority of the PUCCH that carries the HARQ-ACK codebook may be indicated by re-interpreting some of the existing fields in DCI format 1_1 or DCI format 1_2, such as the "Modulation and coding scheme of transport block 1" field, the "New data indicator of transport block 1" field, the "Redundancy version of transport block 1" field, the "HARQ process number" field, the "Antenna port(s)" field, or the "DMRS sequence initialization" field, if the triggering DCI does not schedule a PDSCH.

When the priority of the PUCCH that carries the HARQ-ACK codebook is low, the indicated slot offset may be in units of subslots indicated by subslotLengthForPUCCH, if configured, in the first PUCCH-Config in the PUCCH-ConfigurationList. Otherwise, if subslotLengthForPUCCH is not configured in the first PUCCH-Config in the PUCCH-ConfigurationList, the indicated slot offset may be in units of slots. The indication of the priority of the PUCCH carries the HARQ-ACK codebook may not be needed when uplink-CancellationPriority is configured since only a HARQ-ACK codebook associated with a PUCCH of a low priority may be dropped.

When the priority of the PUCCH that carries the HARQ-ACK codebook is high, the indicated slot offset may be in units of subslots indicated by subslotLengthForPUCCH, if configured, in the second PUCCH-Config in the PUCCH-ConfigurationList. Otherwise, if subslotLengthForPUCCH is not configured in the second PUCCH-Config in the PUCCH-ConfigurationList, the indicated slot offset may be in units of slots.

When the SCS of the triggering DCI and the SCS of the PUCCH that carries the HARQ-ACK codebook are different, the indicated slot offset may be the number of UL slots from the UL slot corresponding to slot offset value 0.

In some implementations, in a case that the SCS of the triggering DCI is larger than the SCS of the PUCCH that carries the HARQ-ACK codebook, the UL slot that corresponds to slot offset value 0 may be the UL slot that overlaps with the DL slot in which the triggering DCI is transmitted.

In some implementations, in a case that the SCS of the triggering DCI is smaller than the SCS of the PUCCH that carries the HARQ-ACK codebook, the UL slot that corresponds to slot offset value 0 may be the UL slot with end boundary aligned to end boundary of the DL slot in which the triggering DCI is transmitted. This may enable faster retransmission of the HARQ-ACK codebook.

In some implementations, in a case that the SCS of the triggering DCI is smaller than the SCS of the PUCCH that carries the HARQ-ACK codebook, the UL slot that corresponds to slot offset value 0 may be the UL slot with start boundary aligned to start boundary of the DL slot in which the triggering DCI is transmitted. This may enable indication of HARQ-ACK codebook in earlier slots to be retransmitted.

When PUCCH carrier switching is configured, the SCS of the indicated slot offset may be based on a reference SCS, since the SCS of an SCell configured with PUCCH resources may be different from the SCS of PCell or PUCCH SCell.

Referring to FIG. 1, FIG. 1 is a schematic diagram illustrating slots in a PCell and an SCell, according to an example implementation of the present disclosure.

In FIG. 1, the PCell is with 15 kHz SCS and the SCell is with 30 kHz SCS, for example. If a UE transmitted a first PUCCH carrying a first HARQ-ACK codebook in slot 0 in the PCell and the UE was scheduled to transmit a second PUCCH carrying a second HARQ-ACK codebook in slot 2 in the SCell but the second PUCCH was cancelled. Then, if the gNB transmits a DCI in slot 2 in the PCell to request the UE to retransmit the second HARQ-ACK codebook, the indicated slot offset may need to be counted based on a reference SCS since the UE may not know the requested HARQ-ACK codebook was scheduled to be carried in a PUCCH in which carrier.

In some cases, the reference SCS may be defined as the maximum SCS of the SCS of the PCell and the SCS of the SCell (e.g., 30 kHz). In some cases, the reference SCS may be defined as the maximum SCS of the SCS of the serving cells which configured with PUCCH resource or PUCCH configuration. For example, a UE is configured with a PCell, a first SCell and a second SCell, while only the PCell and the first SCell are configured with PUCCH resources. The reference SCS may be defined as the maximum SCS of the SCS of the PCell and the first SCell.

Referring back to FIG. 1, in order to trigger retransmission of the second HARQ-ACK codebook in slot 2 in the SCell, the gNB may indicate a slot offset value equal to 2 in a triggering DCI transmitted in slot 2 in the PCell. The UE may determine that the slot offset 0 corresponds to slot 4 in the SCell, then the UE counts two slots backward arriving at slot 2 in the SCell.

In FIG. 1, if the gNB wants to trigger retransmission of the first HARQ-ACK codebook in slot 0 in the PCell, the gNB may indicate a slot offset value equal to 3 or 4 in a triggering DCI transmitted in slot 2 in the PCell. The UE may determine that the slot offset 0 corresponds to slot 4 in the SCell, and the UE may count three or four slots backward arriving at slot 1 or slot 0 in the SCell. Then, the UE may determine that it was scheduled with the first HARQ-ACK codebook in slot 0 in the PCell which overlaps with slot 1 and slot 0 in the SCell, and the UE may retransmit the first HARQ-ACK codebook.

In some cases, the reference SCS may also be defined as the minimum SCS of the SCS of the PCell and the SCS of the SCell. It may be applicable when there is only one slot of the multiple slots with larger SCS that may be configured with PUCCH resources. In such a case, there is no ambiguity of the indicated UL slot with a larger SCS based on the indication with a smaller SCS. For example, referring to FIG. 1, when slot 1 in the PCell is indicated by the triggering DCI, the UE may determine to retransmit a HARQ-ACK codebook in a PUCCH in slot 2 in the SCell if the PUCCH is the only PUCCH in slot 2 in the SCell, slot 3 in the SCell, and slot 1 in the PCell that was configured or scheduled for HARQ-ACK transmission.

In some cases, the reference SCS may be the SCS of the PCell for retransmission of a HARQ-ACK codebook for a PUCCH Cell group including the PCell, or the reference SCS may be the SCS of a PUCCH of the SCell for retransmission a HARQ-ACK codebook for a PUCCH Cell group including the PUCCH SCell.

In some implementations, the carrier in which the PUCCH carries the HARQ-ACK codebook may be explicitly indicated by the triggering DCI, and the slot offset may be based on the SCS of the carrier in which the PUCCH was scheduled.

An indication may be included in the triggering DCI to indicate whether a HARQ-ACK codebook for group common PDSCHs multiplexed with a HARQ-ACK codebook for dedicated PDSCHs in the PUCCH indicated by the triggering DCI should also be retransmitted. Since it is possible that the gNB has decided to retransmit the group common PDSCHs, it may not be necessary for the UE to retransmit the HARQ-ACK codebook for the group common PDSCHs. As such, the reliability of the retransmission of the HARQ-ACK codebook for dedicated PDSCHs may be improved.

A UE
  is not provided coresetPoolIndex or is provided coresetPoolIndex with a value of 0 for first CORESETs on active DL BWPs of serving cells, and
  is provided coresetPoolIndex with a value of 1 for second CORESETs on active DL BWPs of the serving cells, and
  is provided ackNackFeedbackMode=separate,
  when it receives a triggering DCI for HARQ-ACK retransmission in a CORESET of the first CORESETs, determines a PUCCH in a slot corresponding the indicated slot offset which carries HARQ-ACK information associated with the first CORESETs, or when it receives a triggering DCI for HARQ-ACK retransmission in a CORESET of the second CORESETs, determines a PUCCH in a slot corresponding the indicated slot offset which carries HARQ-ACK information associated with the second CORESETs.

When a second PUCCH in a first slot was scheduled by a first triggering DCI for retransmission of a first HARQ-ACK codebook that was carried in a first PUCCH, and when there is a second HARQ-ACK codebook to be transmitted together with the first HARQ-ACK codebook in the second PUCCH, if the UE receives a second triggering DCI indicating the second PUCCH, the UE may only retransmit the second HARQ-ACK codebook in a third PUCCH scheduled by the second triggering DCI. It is noted that the second HARQ-ACK codebook may be transmitted in the second PUCCH if the second HARQ-ACK codebook contains HARQ-ACK bits corresponding to a PDSCH scheduled by the first triggering DCI or if HARQ-ACK bits in the second HARQ-ACK codebook are scheduled to be transmitted in the first slot by a DCI scheduling a PDSCH corresponding to HARQ-ACK bits in the second HARQ-ACK codebook.

In some implementations, the UE may not expect to receive the second triggering DCI indicating the second PUCCH carrying the first HARQ-ACK codebook and the second HARQ-ACK codebook.

In some implementations, the UE may retransmit the first HARQ-ACK codebook and the second HARQ-ACK codebook in the third PUCCH in a second slot, if the second triggering DCI does not schedule a PDSCH or if the UE does not receive a DCI scheduling a PDSCH with corresponding HARQ-ACK bits in a third HARQ-ACK codebook transmitted in the second slot.

In some implementations, the UE may not expect to receive the second triggering DCI indicating the second PUCCH carrying the first HARQ-ACK codebook and the second HARQ-ACK codebook if the second triggering DCI schedules a PDSCH or if there is a third HARQ-ACK codebook scheduled to be transmitted in the same slot as the slot in which the first HARQ-ACK codebook and the second HARQ-ACK codebook are retransmitted.

The UE may need to record the slot index in which a PUCCH is dropped. The UE may also associate the recorded slot index with a stored HARQ-ACK codebook that is dropped. The HARQ-ACK codebook may be stored upon construction of the HARQ-ACK codebook or the HARQ-ACK codebook may be stored when it is dropped as a result of the PUCCH being dropped. The UE may retransmit the stored HARQ-ACK codebook associated to the slot index corresponding to the slot that is indicated by the triggering DCI. The UE may separately store the HARQ-ACK codebook for HARQ-ACK bits corresponding to PDSCHs with corresponding DCI, the HARQ-ACK codebook for HARQ-ACK bits corresponding to SPS PDSCHs, the HARQ-ACK codebook for HARQ-ACK bits corresponding to group common PDSCHs, and the HARQ-ACK codebook for SL HARQ-ACK bits. The UE may also store the value of the last counter DAI or the value of the total DAI associated with the HARQ-ACK codebook.

A PUCCH may be multiplexed in a PUSCH if the PUCCH overlaps with the PUSCH, and the UCI carried in the PUCCH including a HARQ-ACK codebook and CSI may be multiplexed in the PUCCH. If the PUSCH multiplexed with a HARQ-ACK codebook is dropped, the gNB may transmit a triggering DCI to trigger retransmission of the HARQ-ACK codebook multiplexed in the PUSCH. The triggering DCI indicates the slot offset and the physical layer priority which may be used to identify the PUCCH as described above. The method is beneficial since the same method for retransmission of a HARQ-ACK in a dropped PUCCH can be used, and since the PUSCH may be in another serving cell than the serving cell for the PUCCH which may have a different SCS and a slot offset in units of subslots cannot be used to indicate a PUSCH.

The UE may need to record the slot index in which a PUCCH is multiplexed in a PUSCH or to record the slot index in which a PUCCH is multiplexed in a PUSCH and the PUSCH is dropped. It is noted that the slot index is the slot index of the serving cell of the PUCCH. The UE may also associate the recorded slot index with a stored HARQ-ACK codebook that is dropped. The HARQ-ACK codebook may be stored before it is multiplexed in the PUSCH or the HARQ-ACK codebook may be stored when it is dropped as a result of the PUSCH being dropped. The UE may retransmit the stored HARQ-ACK codebook associated to the slot index corresponding to the slot that is indicated by the triggering DCI.

One of the advantages of storing the HARQ-ACK codebook before it is multiplexed in the PUSCH is that when harq-ACK-SpatialBundlingPUCCH is not configured and harq-ACK-SpatialBundlingPUCCH is configured, spatial bundling is not performed for the HARQ-ACK information bits corresponding to a PDSCH for the retransmitted HARQ-ACK codebook.

One of the advantages of storing the HARQ-ACK codebook when it is dropped as a result of the PUSCH being dropped is that it requires less memory space for storing HARQ-ACK codebooks, which avoids increasing the UE complexity.

It is noted that the UE may determine the PUCCH resource set based on the payload size of the retransmitted HARQ-ACK codebook. Therefore, the gNB may need to determine the PUCCH resource set based on the size of the HARQ-ACK codebook with spatial bundling when harq-ACK-SpatialBundlingPUSCH is configured, if the UE stores the HARQ-ACK codebook when it is dropped as a result of the PUSCH being dropped. The timing when the UE stores the HARQ-ACK codebook may be predefined or configured by the gNB to ensure no discrepancy between the UE and the gNB on the size of the retransmitted HARQ-ACK codebook. The UE may separately store the HARQ-ACK codebook for HARQ-ACK bits corresponding to PDSCHs with corresponding DCI, the HARQ-ACK codebook for HARQ-ACK bits corresponding to SPS PDSCH, the HARQ-ACK codebook for HARQ-ACK bits corresponding to group common PDSCHs, and the HARQ-ACK codebook for SL HARQ-ACK bits. The UE may also store the value of the last counter DAI or the value of the total DAI associated with the HARQ-ACK codebook.

DCI Miss Detection

The UE may miss the DCI that schedules the PDSCH corresponding to a HARQ-ACK codebook, and the HARQ-ACK codebook may be considered by a gNB as dropped. For example, when the gNB schedules another PUCCH transmission or a PUSCH transmission overlapping with the PUCCH carrying the HARQ-ACK codebook, it may cause the PUCCH carrying the HARQ-ACK codebook being dropped or cancelled. In this case, when UE receives the signaling that requests the UE to retransmit the HARQ-ACK codebook, the UE may not know what to transmit. The UE behavior for this case may need to be defined.

When a UE receives a DCI triggering retransmission of a HARQ-ACK codebook and the UE determines that there was no HARQ-ACK codebook constructed for a PUCCH in the indicated slot n, the following method (1) to (3) may be used.

Method (1): when the physical layer priority of the indicated PUCCH is associated with Type-1 HARQ-ACK codebook, the UE may construct a Type-1 HARQ-ACK codebook for retransmission with the assumption that the DCI that schedules a PDSCH with corresponding HARQ-ACK information to be transmitted in slot n was received and that the PDSCH was not successfully received. The UE may transmit the Type-1 HARQ-ACK codebook in a PUCCH resource indicated by the triggering DCI. In some implementations, the triggering DCI may include a counter DAI field. When the counter DAI field indicates a value of 1, the UE may determine that the Type-1 HARQ-ACK codebook for retransmission contains a single NACK bit.

In some implementations, when the triggering DCI schedules a PDSCH, a first HARQ-ACK codebook that is constructed for retransmission and a second HARQ-ACK codebook that contains the HARQ-ACK bit corresponding to the PDSCH are concatenated for transmission in a PUCCH that is indicated by the triggering DCI. When performing concatenation of the HARQ-ACK codebooks, the first HARQ-ACK codebook may be prepended to the second HARQ-ACK codebook or may be appended to the second HARQ-ACK codebook.

In some implementations, when the triggering DCI that triggers retransmission of a first HARQ-ACK codebook does not schedule a PDSCH and when a second HARQ-ACK codebook corresponding to a PDSCH is indicated or configured to be transmitted in a slot, the first HARQ-ACK codebook and the second HARQ-ACK codebook are concatenated for transmission in a PUCCH in the slot if the triggering DCI indicates the PUCCH in the slot.

In some cases, the second HARQ-ACK codebook may only include HARQ-ACK bits corresponding to a single PDSCH if the first HARQ-ACK codebook and the second HARQ-ACK codebook are concatenated.

Method (2): when the physical layer priority of the indicated PUCCH is associated with Type-2 HARQ-ACK codebook, the UE may construct a Type-2 HARQ-ACK codebook with the assumption that the DCI that schedules a PDSCH with corresponding HARQ-ACK information to be transmitted in slot n was received and that the PDSCH was not successfully received. The UE may transmit the Type-2 HARQ-ACK codebook in a PUCCH resource indicated by the triggering DCI. The triggering DCI may include a field to explicitly indicate if the HARQ-ACK codebook triggered for retransmission includes a dynamically scheduled HARQ-ACK codebook or only include a HARQ-ACK codebook for SPS PDSCHs.

Specifically, if PDSCH-CodeBlockGroupTransmission is not configured for any serving cell and if maxNrofCodeWordsScheduledByDCI is configured for at least one serving cell and if harq-ACK-SpatialBundlingPUCCH is configured, the constructed Type-2 HARQ-ACK codebook may include one NACK bit and the HARQ-ACK bits for an SPS PDSCH that is to be transmitted in slot n. In some implementations, the triggering DCI may include a total DAI field. When the total DAI field indicates a value of X, the constructed Type-2 HARQ-ACK codebook may include X NACK bits and the HARQ-ACK bits for an SPS PDSCH that is to be transmitted in slot n. The total DAI field may be re-interpretation of a counter DAI field of the DCI format. In some implementations, the constructed Type-2 HARQ-ACK codebook may include Y NACK bits and the HARQ-ACK bits for an SPS PDSCH that is to be transmitted in slot n, where Y may be a configured value or Y may be determined as 4 bits or 2 bits if a counter DAI field with 2 bits or 1 bit is included in the DCI format scheduling a PDSCH, respectively.

Specifically, if PDSCH-CodeBlockGroupTransmission is not configured for any serving cell and if maxNrofCodeWordsScheduledByDCI is configured for at least one serving cell and if harq-ACK-SpatialBundlingPUCCH is not configured, the constructed Type-2 HARQ-ACK codebook may include two NACK bits and the HARQ-ACK bits for an SPS PDSCH that is to be transmitted in slot n. In some implementations, the triggering DCI may include a total DAI field. When the total DAI field indicates a value of X, the constructed Type-2 HARQ-ACK codebook may include 2*X NACK bits and the HARQ-ACK bits for an SPS PDSCH that is to be transmitted in slot n. The total DAI field may be re-interpretation of a counter DAI field of the DCI format. In some implementations, the constructed Type-2 HARQ-ACK codebook may include 2*Y NACK bits and the HARQ-ACK bits for an SPS PDSCH that is to be transmitted in slot n, where Y may be a configured value or Y may be determined as 4 bits or 2 bits if a counter DAI field with 2 bits or 1 bit is included in the DCI format scheduling a PDSCH, respectively.

Specifically, if PDSCH-CodeBlockGroupTransmission is configured for $N_{cells}^{DL,CBG}$ serving cells and if maxNrofCodeWordsScheduledByDCI is configured for at least one serving cell and if harq-ACK-SpatialBundlingPUCCH is not configured, the constructed Type-2 HARQ-ACK codebook may include $N_{HARQ-ACK,max}^{CBG/TB,max}$ NACK bits and the HARQ-ACK bits for an SPS PDSCH that is to be transmitted in slot n, where $N_{HARQ-ACK,max}^{CBG/TB,max}$ is the maximum value of $N_{TB,c}^{DL} \cdot N_{HARQ-ACK,c}^{CBG/TB,max}$ across all $N_{cells}^{DL,CBG}$ serving cells, $N_{TB,c}^{DL}$ is the value of maxNrofCodeWordsScheduledByDCI for serving cell c, and $N_{HARQ-ACK,c}^{CBG/TB,max}$ is the value of PDSCH-CodeBlockGroupTransmission for serving cell c. In some implementations, the triggering DCI may include a total DAI field. When the total DAI field indicates a value of X, the constructed Type-2 HARQ-ACK codebook may include $N_{HARQ-ACK,max}^{CBG/TB,max}*X$ NACK bits and the HARQ-ACK bits for an SPS PDSCH that is to be transmitted in slot n. The total DAI field may be re-interpretation of a counter DAI field of the DCI format. In some implementations, the constructed Type-2 HARQ-ACK codebook may include $N_{HARQ-ACK,max}^{CBG/TB,max}*Y$ NACK bits and the HARQ-ACK bits for an SPS PDSCH that is to be transmitted in slot n, where Y may be a configured value or Y may be determined as 4 bits or 2 bits if a counter DAI field with 2 bits or 1 bit is included in the DCI format scheduling a PDSCH, respectively. In some implementations, when the triggering DCI is received in a serving cell without PDSCH-CodeBlockGroupTransmission being configured, the Type-2 HARQ-ACK codebook is constructed with the assumption that PDSCH-CodeBlockGroupTransmission is not configured for any serving cell.

In some implementations, when the triggering DCI schedules a PDSCH, a first HARQ-ACK codebook that is constructed for retransmission and a second HARQ-ACK codebook that contains the HARQ-ACK bit corresponding to the PDSCH are concatenated for transmission in a PUCCH that is indicated by the triggering DCI.

In some implementations, when the triggering DCI that triggers retransmission of a first HARQ-ACK codebook does not schedule a PDSCH and when a second HARQ-ACK codebook corresponding to a PDSCH is indicated (e.g., by another DCI) or configured to be transmitted in a slot, the first HARQ-ACK codebook and the second HARQ-ACK codebook are concatenated for transmission in a PUCCH in the slot if the triggering DCI indicates the PUCCH in the slot.

In some cases, the second HARQ-ACK codebook may only include HARQ-ACK bits corresponding to a single PDSCH if the first HARQ-ACK codebook and the second HARQ-ACK codebook are concatenated.

In some cases, the HARQ-ACK bits for SPS PDSCH in a first slot may not be included in the constructed Type-2 HARQ-ACK codebook to be retransmitted in a second slot if the HARQ-ACK bits for an SPS PDSCH are transmitted in another slot (e.g., a third slot) after the first slot in which it was not transmitted, e.g., the HARQ-ACK bits for SPS PDSCH are deferred to be transmitted in the third slot by a SPS HARQ-ACK deferral procedure, or if an indication in the triggering DCI or an RRC configuration indicates that the HARQ-ACK bits for an SPS PDSCH is not included in the constructed Type-2 HARQ-ACK codebook.

In some implementations, when a UE receives a DCI triggering retransmission of a HARQ-ACK codebook and the UE determines that there was a Type-2 HARQ-ACK codebook constructed in a PUCCH in the indicated slot n with last counter DAI value equal to $V_{temp2}$, the UE may construct the Type-2 HARQ-ACK codebook based on a total DAI value indicated in the triggering DCI, where the total DAI field may be re-interpretation of a counter DAI field of the DCI format. Specifically, the UE may run the pseudo code according to Section 9.1.3 in TS 38.213, except that $V_{temp2}$ may be set as the total DAI value indicated in the triggering DCI after the end of the while loop for m.

In some implementations, the UE may append a number of NACK bits to the HARQ-ACK codebook, and the number of NACK bits $O^{NACK}$ may be determined by Table 1 as follows. $V_{temp2}$ is set to the value of the total DAI indicated in the triggering DCI, and $V_{temp}$ is set to the value of the total DAI or the last counter DAI in the last scheduling DCI associated with the HARQ-ACK codebook.

TABLE 1 if $V_{temp2} < V_{temp}$
   j = 1
else
   j = 0
end if
if harq-ACK-SpatialBundlingPUCCH is not provided to the UE and the UE is configured
by maxNrofCodeWordsScheduledByDCI with reception of two transport blocks for at least
one configured DL BWP of a serving cell,
   $O^{NACK} = 2 \cdot (4 \cdot j + (V_{temp2} - V_{temp}))$
else
   $O^{NACK} = 4 \cdot j + (V_{temp2} - V_{temp})$
end if Method (3): When a UE receives a DCI triggering retransmission of a HARQ-ACK codebook and the triggering DCI schedules a second PUCCH in slot m for retransmission of the HARQ-ACK codebook, if the UE determines that there is no HARQ-ACK codebook constructed for a first PUCCH in slot n indicated by the triggering DCI, the UE may not transmit the second PUCCH.

In some implementations, the UE may select the first PUCCH resource set and determine the second PUCCH resource from the first PUCCH resource set based on the PRI indicated by the triggering DCI. The UE may drop the second PUCCH if the second PUCCH overlaps with other PUCCHs or PUSCHs.

Figure 2:
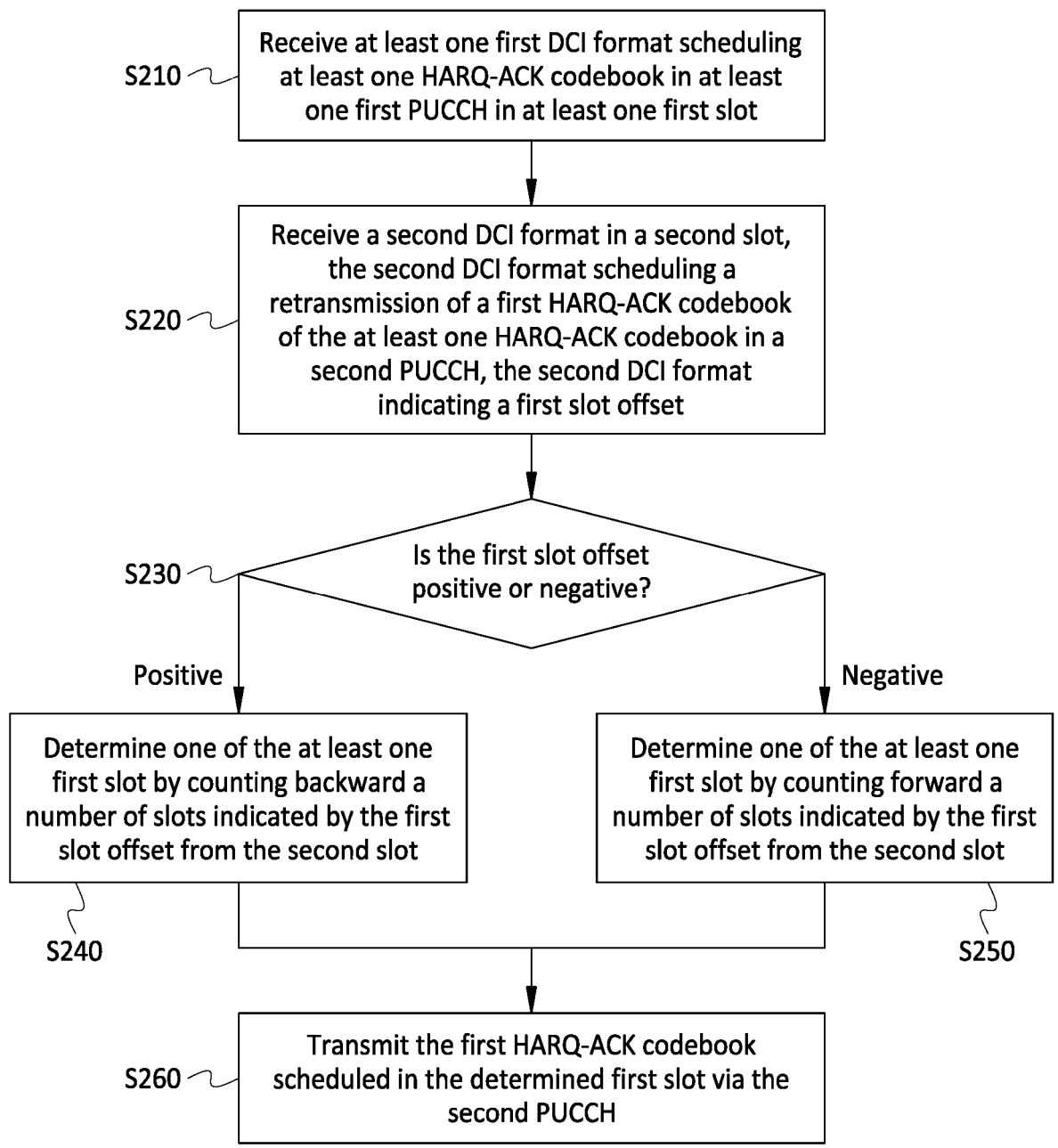
FIG. 2 is a flowchart illustrating a method performed by a UE for HARQ-ACK retransmission, according to an example implementation of the present disclosure.
Figure 3A:
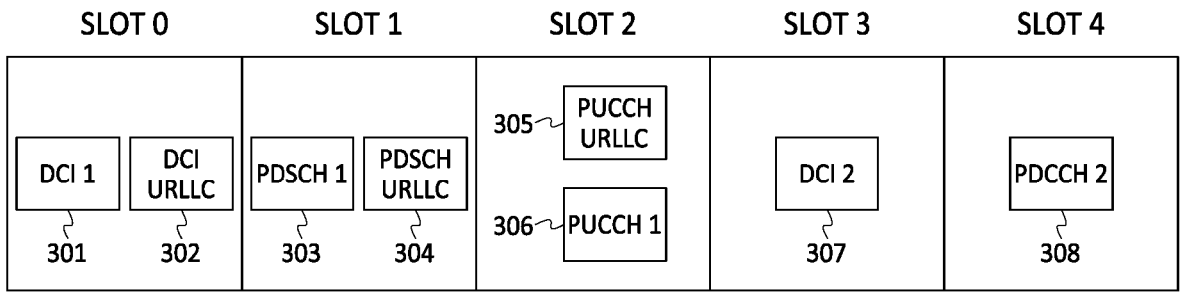
FIG. 3A is a schematic diagram illustrating a method performed by a UE for HARQ-ACK retransmission, according to an example implementation of the present disclosure.
Figure 3B:
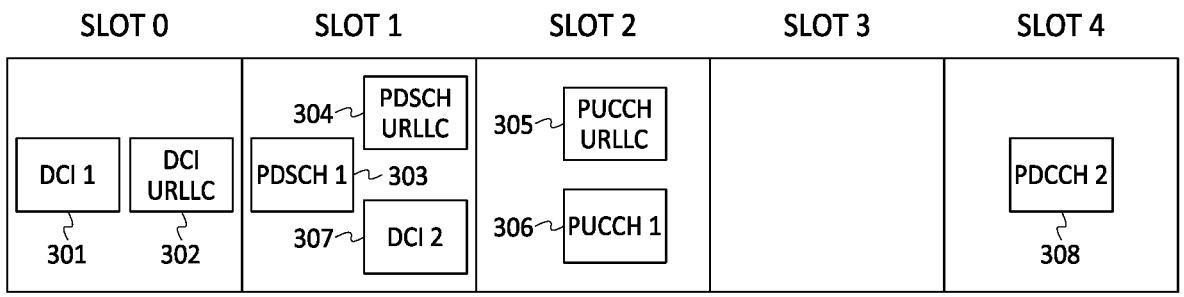
FIG. 3B is a schematic diagram illustrating a method performed by a UE for HARQ-ACK retransmission, according to an example implementation of the present disclosure.

FIG. 2 is a flowchart illustrating a method performed by a UE for HARQ-ACK retransmission, according to an example implementation of the present disclosure. FIG. 3A is a schematic diagram illustrating a method performed by a UE for HARQ-ACK retransmission, according to an example implementation of the present disclosure. FIG. 3B is a schematic diagram illustrating a method performed by a UE for HARQ-ACK retransmission, according to an example implementation of the present disclosure.

Referring to FIG. 2 first, although steps S210 to S260 are illustrated as separate steps represented as independent blocks, these separately illustrated actions should not be construed as necessarily order dependent. The order in which the steps are performed in FIG. 2 is not intended to be construed as a limitation, and any number of the disclosed blocks may be combined in any order to implement the method, or an alternate method.

It is noted that the method for HARQ-ACK retransmission illustrated in FIG. 2 may be consistent with at least part of descriptions described above, therefore same details may not be repeated again.

Referring to FIG. 2, in step S210, the UE may receive at least one first DCI format scheduling at least one HARQ-ACK codebook in at least one first PUCCH in at least one first slot.

Referring to FIGS. 3A and 3B, in some implementations, the UE may receive the first DCI format 301 (e.g., in SLOT 0). The first DCI format 301 may schedule a first PDSCH 303 (e.g., in SLOT 1) and a first PUCCH 306 (e.g., in SLOT 2) corresponding to the first PDSCH 303. The first PUCCH 306 may be scheduled for transmitting a HARQ-ACK codebook corresponding to the first PDSCH 303. It is noted that the first DCI format 301 may schedule more than one PDSCHs and more than one HARQ-ACK code books in more than one PUCCHs in some implementations, which is not limited herein.

In some implementations, the first PUCCH 306 may be dropped. For example, the UE may be scheduled (e.g., in SLOT 1) with another PDSCH 304 (e.g., for URLLC traffic). Therefore, the UE may be scheduled with another PUCCH 305 (e.g., for URLLC traffic) corresponding to the PDSCH 304, and with a higher priority than the first PUCCH 306. In a case that the PUCCH 305 is scheduled and overlaps with the first PUCCH 306 (e.g., in SLOT 2), the first PUCCH 306 may be dropped and as such the base station (e.g., a gNB) may consider that the first PDSCH 303 is not well-received and may try to re-transmit it. In order to minimize wasting radio resources, a mechanism for retransmitting the HARQ-ACK codebook in the dropped first PUCCH 306 is needed.

Referring to FIG. 2, in step S220, the UE may receive a second DCI format in a second slot. The second DCI format schedules a retransmission of a first HARQ-ACK codebook of the at least one HARQ-ACK codebook in a second PUCCH, and indicates a first slot offset.

Specifically, the second DCI format may indicate the to-be-retransmitted first HARQ-ACK codebook with the first slot offset. For example, in a case that the second DCI format is received in the second slot n and the first slot offset indicated therein is 1, the UE may determine a slot m=n−1, and the first HARQ-ACK codebook carried in the PUCCH scheduled in slot m is to be retransmitted. The second DCI format may be, for example, DCI format 1_1 or DCI format 1_2, but is not limited herein.

In some implementations, the second DCI format may not schedule a PDSCH, and the first slot offset may be determined via an MCS field of the second DCI format.

In some implementations, the second DCI format may include a triggering field for triggering the retransmission of the first HARQ-ACK codebook. For example, in a case that the triggering field has a field value of 1, the retransmission of the first HARQ-ACK codebook is triggered. The triggering field may be, for example, pdsch-HARQ-ACK-retx or pdsch-HARQ-ACK-retxDCI-1-2, but is not limited herein.

In some implementations, the second DCI format may schedule the second PUCCH in a third slot for retransmitting the first HARQ-ACK codebook with a second slot offset. For example, in a case that the second DCI format is received in the second slot n and the second slot offset indicated therein is k, the UE may determine a third slot n+k to retransmit the second PUCCH with the first HARQ-ACK codebook. It is noted that the third slot n+k is after the slot m (e.g., n−1) mentioned before.

In some implementations, the carrier in which the PUCCH is transmitted may be switched or indicated by a DCI format. For example, the at least one first DCI format may indicate that the at least one first PUCCH is transmitted in a first carrier, and the second DCI format may indicate that the second PUCCH is transmitted in a second carrier. It is noted that at least one of the first carrier or the second carrier is a PCell.

In some implementations, the first slot offset may be indicated based on an SCS of a reference cell which may be the PCell, the details of which have been described above with reference to FIG. 1, thus are not repeated.

Referring to FIG. 3A, in some implementations, the UE may receive the second DCI format 307 (e.g., in SLOT 3). The second DCI format 307 may indicate a first slot offset of 1 in order to schedule a retransmission of the first HARQ-ACK codebook carried in the first PUCCH 306 (e.g., in SLOT 2). In some implementations, the UE may further indicate a second slot offset of 1 to schedule the second PUCCH 308 (e.g., in SLOT 4) for retransmitting the first HARQ-ACK codebook.

Referring to FIG. 3B, in some implementations, the UE may receive the second DCI format 307 (e.g., in SLOT 1). The second DCI format 307 may indicate a first slot offset of −1 in order to schedule a retransmission of the first HARQ-ACK codebook carried in the first PUCCH 306 (e.g., in SLOT 2). In some implementations, the UE may further indicate a second slot offset of 3 to schedule the second PUCCH 308 (e.g., in SLOT 4) for retransmitting the first HARQ-ACK codebook.

In light of the above, referring back to FIG. 2, in step S230, in a case that the first slot offset is positive, step S240 is performed; and in a case that the first slot offset is negative, step S250 is performed.

In step S240, the UE may determine one of the at least one first slot by counting backward a number of slots indicated by the first slot offset from the second slot.

In some implementations, in a case that the second DCI format is received in the second slot n and the first slot offset indicated therein is 1, the UE may determine a slot m=n−1, and the first HARQ-ACK codebook carried in the first PUCCH scheduled in slot m is to be retransmitted. Taking FIG. 3A as an example, the second DCI format 307 is received in SLOT 3 and the first slot offset indicated in the second DCI format 307 is 1. Therefore, the UE may determine a slot by counting backward 1 slot from SLOT 3 to arrive at SLOT 2. In this case, SLOT 2 is determined, and the first HARQ-ACK codebook carried in the first PUCCH 306 in SLOT 2 is to be retransmitted.

In step S250, the UE may determine one of the at least one first slot by counting forward a number of slots indicated by the first slot offset from the second slot.

In some implementations, in a case that the second DCI format is received in the second slot n and the first slot offset indicated therein is 1, the UE may determine a slot m=n−1, and the first HARQ-ACK codebook carried in the first PUCCH scheduled in slot m is to be retransmitted. Taking FIG. 3B as an example, the second DCI format 307 is received in SLOT 1 and the first slot offset indicated in the second DCI format 307 is −1. Therefore, the UE may determine a slot by counting forward 1 slot from SLOT 1 to arrive at SLOT 2. In this case, SLOT 2 is determined, and the first HARQ-ACK codebook carried in the first PUCCH 306 in SLOT 2 is to be retransmitted.

In some implementations, the first slot offset may be 0. In this case, the slot determined by step S240 and step S250 should be the same as the slot in which the second DCI format is received (e.g., the second slot n). Therefore, both steps S240 and S250 may be entered in a case that the first slot offset is 0.

Referring back to FIG. 2, in step S260, the UE may transmit the first HARQ-ACK codebook scheduled in the determined first slot via the second PUCCH.

In FIG. 3A and FIG. 3B, SLOT 2 is determined in the previous step. Therefore, the UE may transmit the first HARQ-ACK codebook carried in the first PUCCH 306 scheduled in SLOT 2 via the second PUCCH 308.

According to the above, the base station may receive the retransmitted first HARQ-ACK codebook. Hence, there is no need to retransmit the first PDSCH 303, thereby minimizing radio resource waste.

Figure 4:
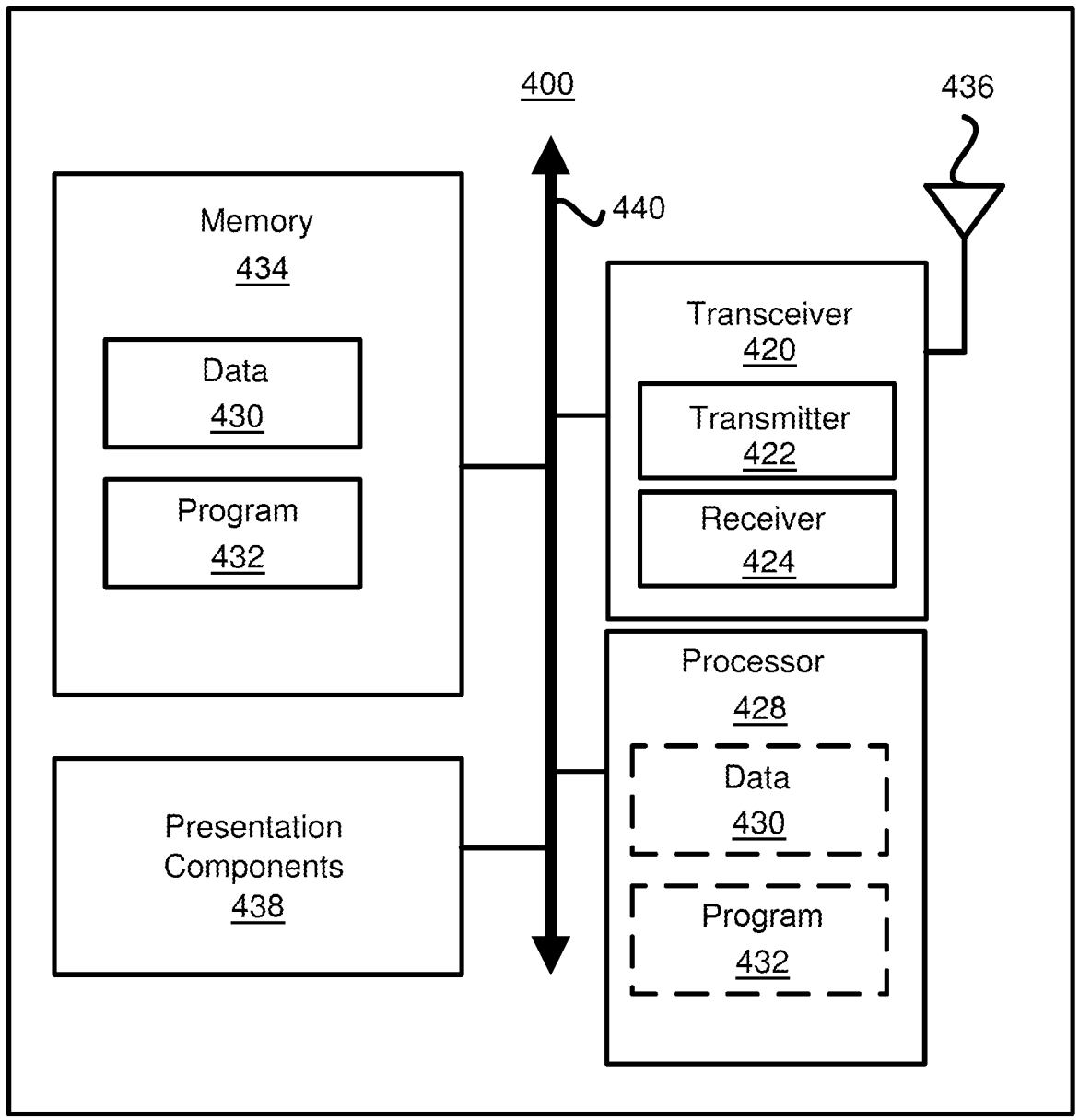
FIG. 4 is a block diagram illustrating a node for wireless communication, according to an example implementation of the present application.

FIG. 4 is a block diagram illustrating a node for wireless communication, according to an example implementation of the present application. As illustrated in FIG. 4, the node 400 may include a transceiver 420, a processor 428, a memory 434, one or more presentation components 438, and at least one antenna 436. The node 400 may also include an RF spectrum band module, a BS communications module, a network communications module, and a system communications management module, Input/Output (I/O) ports, I/O components, and a power supply (not explicitly illustrated in FIG. 4). Each of these components may be in communication with each other, directly or indirectly, over one or more buses 440. In some implementations, the node 400 may be a UE or a BS that performs various functions described herein, for example, with reference to FIGS. 1 through 3B.

The transceiver 420 having a transmitter 422 (e.g., transmitting/transmission circuitry) and a receiver 424 (e.g., receiving/reception circuitry) may be configured to transmit and/or receive time and/or frequency resource partitioning information. In some implementations, the transceiver 420 may be configured to transmit in different types of subframes and slots, including, but not limited to, usable, non-usable and flexibly usable subframes and slot formats. The transceiver 420 may be configured to receive data and control channels.

The node 400 may include a variety of computer-readable media. Computer-readable media can be any available media that can be accessed by the node 400 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the above should also be included within the scope of computer-readable media.

The memory 434 may include computer storage media in the form of volatile and/or non-volatile memory. The memory 434 may be removable, non-removable, or a combination thereof. For example, the memory 402 may include solid-state memory, hard drives, optical-disc drives, etc. As illustrated in FIG. 4, the memory 434 may store computer-readable and/or computer-executable instructions 432 (e.g., software code(s) or computer-executable program(s)) that are configured to, when executed, cause the processor 428 to perform various functions described herein, for example, with reference to FIGS. 1 through 3B. Alternatively, the instructions 432 may not be directly executable by the processor 428 but may be configured to cause the node 400 (e.g., when compiled and executed) to perform various functions described herein.

The processor 428 (e.g., having processing circuitry) may include an intelligent hardware device, a Central Processing Unit (CPU), a microcontroller, an ASIC, etc. The processor 428 may include memory. The processor 428 may process the data 430 and the instructions 432 received from the memory 434, and information through the transceiver 420, the baseband communications module, and/or the network communications module. The processor 428 may also process information to be sent to the transceiver 420 for transmission through the antenna 436, to the network communications module for transmission to a CN.

One or more presentation components 438 may present data indications to a person or other devices. Examples of presentation components 438 may include a display device, speaker, printing component, vibrating component, etc.

From the present disclosure, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the particular implementations described above. Still, many rearrangements, modifications, and substitutions are possible without departing from the scope of the present disclosure.

What is claimed is:

1. A method for Hybrid Automatic Repeat reQuest-ACKnowledgement (HARQ-ACK) retransmission performed by a user equipment (UE), the method comprising:
receiving at least one first Downlink Control Information (DCI) format for scheduling at least one HARQ-ACK codebook in at least one first Physical Uplink Control CHannel (PUCCH) in at least one first slot;
receiving a second DCI format for scheduling a retransmission of a first HARQ-ACK codebook of the at least one HARQ-ACK codebook in a second PUCCH, the second DCI format being received in a second slot and indicating a first slot offset;
determining one of the at least one first slot by counting forward, from the second slot, a number of slots indicated by the first slot offset, wherein the first slot offset includes a negative value and the number of slots counted forward is equal to an absolute value of the negative value included in the first slot offset; and
transmitting the first HARQ-ACK codebook scheduled in the one of the at least one first slot via the second PUCCH.

2. The method of claim 1, wherein:
the second PUCCH is transmitted in a third slot,
the second DCI format further indicates a second slot offset, and
the third slot is determined based on the second slot and the second slot offset.

3. The method of claim 1, wherein:
the at least one first DCI format includes a field indicating that the at least one first PUCCH is transmitted in a first carrier,
the second DCI format includes a field indicating that the second PUCCH is transmitted in a second carrier, and
at least one of the first carrier and the second carrier is associated with a primary cell (PCell).

4. The method of claim 1, wherein:
the second DCI format further comprises a triggering field, and
the retransmission of the first HARQ-ACK codebook is triggered by the triggering field having a field value of 1.

5. A user equipment (UE), comprising:
processing circuitry;
a transceiver coupled to the processing circuitry; and
a non-transitory computer-readable medium coupled to the processing circuitry and storing one or more computer-executable instructions that, when executed by the processing circuitry, cause the UE to:
receive, through the transceiver, at least one first Downlink Control Information (DCI) format for scheduling at least one Hybrid Automatic Repeat reQuest-ACKnowledgement (HARQ-ACK) codebook in at least one first Physical Uplink Control CHannel (PUCCH) in at least one first slot;
receive, through the transceiver, a second DCI format for scheduling a retransmission of a first HARQ-ACK codebook of the at least one HARQ-ACK codebook in a second PUCCH, the second DCI format being received in a second slot and indicating a first slot offset;
determine one of the at least one first slot; and
transmit, through the transceiver, the first HARQ-ACK codebook scheduled in the one of the at least one first slot via the second PUCCH, wherein:
in a case that the first slot offset includes a positive value, the one of the at least one first slot is determined by counting backward, from the second slot, a number of slots indicated by the first slot offset, and
in a case that the first slot offset includes a negative value, the one of the at least one first slot is determined by counting forward, from the second slot, the number of slots indicated by the first slot offset.

6. The UE of claim 5, wherein:
the one or more computer-executable instructions, when executed by the processing circuitry, further cause the UE to determine the first slot offset based on a Modulating and Coding Scheme (MCS) field of the second DCI format, and
the second DCI format does not schedule a Physical Downlink Shared CHannel (PDSCH).

7. The UE of claim 5, wherein:
the second PUCCH is transmitted in a third slot,
the second DCI format further indicates a second slot offset, and
the third slot is determined based on the second slot and the second slot offset.

8. The UE of claim 5, wherein:
the at least one first DCI format includes a field indicating that the at least one first PUCCH is transmitted in a first carrier,
the second DCI format includes a field indicating that the second PUCCH is transmitted in a second carrier, and
at least one of the first carrier and the second carrier is associated with a primary cell (PCell).

9. The UE of claim 8, wherein:
the first slot offset is indicated based on a subcarrier spacing (SCS) of a reference cell, and
the reference cell is the PCell.

10. The UE of claim 5, wherein:
the second DCI format further comprises a triggering field, and
the retransmission of the first HARQ-ACK codebook is triggered by the triggering field having a field value of 1.

11. A base station apparatus, comprising:
processing circuitry;
a transceiver coupled to the processing circuitry; and
a non-transitory computer-readable medium coupled to the processing circuitry and storing one or more computer-executable instructions that, when executed by the processing circuitry, cause the base station apparatus to:
transmit, through the transceiver, at least one first Downlink Control Information (DCI) format for scheduling at least one Hybrid Automatic Repeat reQuest-ACKnowledgement (HARQ-ACK) codebook in at least one first Physical Uplink Control CHannel (PUCCH) in at least one first slot; and
transmit, through the transceiver, a second DCI format for scheduling a retransmission of a first HARQ-ACK codebook of the at least one HARQ-ACK codebook in a second PUCCH, the second DCI format being transmitted in a second slot and indicating a first slot offset, wherein:
the first HARQ-ACK codebook is scheduled in one of the at least one first slot, in a case that the first slot offset includes a positive value, the one of the at least one first slot includes a number of slots, before the second slot, indicated by the first slot offset, and in a case that the first slot offset includes a negative value, the one of the at least one first slot is the number of slots, after the second slot, indicated by the first slot offset.

12. The base station apparatus of claim 11, wherein:

the second DCI format does not schedule a Physical Downlink Shared CHannel (PDSCH), and the first slot offset is indicated in a Modulating and Coding Scheme (MCS) field of the second DCI format.

13. The base station apparatus of claim 11, wherein:

the second PUCCH is scheduled in a third slot, the second DCI format further indicates a second slot offset, and the third slot is associated with the second slot and the second slot offset.

14. The base station apparatus of claim 11, wherein:

the at least one first DCI format includes a field indicating that the at least one first PUCCH is transmitted in a first carrier, the second DCI format includes a field indicating that the second PUCCH is transmitted in a second carrier, and at least one of the first carrier and the second carrier is associated with a primary cell (PCell).

15. The base station apparatus of claim 14, wherein:

the first slot offset is indicated based on a subcarrier spacing (SCS) of a reference cell, and the reference cell is the PCell.

16. The base station apparatus of claim 11, wherein:

the second DCI format further comprises a triggering field, and the retransmission of the first HARQ-ACK codebook is triggered by the triggering field having a field value of 1.

* * * * *